(12) United States Patent
Raghunathan et al.

(10) Patent No.: US 9,444,768 B1
(45) Date of Patent: *Sep. 13, 2016

(54) MULTI-ROUTER SYSTEM HAVING SHARED NETWORK INTERFACES

(71) Applicant: Juniper Networks, Inc., Sunnyvale, CA (US)

(72) Inventors: Sriram Raghunathan, Cupertino, CA (US); Yong Luo, Santa Clara, CA (US); Wai Leung Chan, San Jose, CA (US); Surinder Singh, Santa Clara, CA (US); Abbas Sakarwala, Sunnyvale, CA (US); Harmeet Sahni, Fremont, CA (US); Jian Cui, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,926

(22) Filed: Jan. 25, 2013

Related U.S. Application Data

(63) Continuation of application No. 12/618,536, filed on Nov. 13, 2009, now Pat. No. 8,369,345.

(51) Int. Cl.

| | |
|---|---|
| *H04L 12/931* | (2013.01) |
| *H04L 12/741* | (2013.01) |
| *H04L 12/28* | (2006.01) |
| *H04L 12/773* | (2013.01) |
| *H04L 12/721* | (2013.01) |
| *H04L 12/933* | (2013.01) |
| *H04L 12/947* | (2013.01) |

(52) U.S. Cl.
CPC ............ *H04L 49/40* (2013.01); *H04L 12/2896* (2013.01); *H04L 45/44* (2013.01); *H04L 45/60* (2013.01); *H04L 45/66* (2013.01); *H04L 45/68* (2013.01); *H04L 45/745* (2013.01); *H04L 49/15* (2013.01); *H04L 49/25* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 3,962,681 | A | 6/1976 | Requa et al. |
| 4,032,899 | A | 6/1977 | Jenny et al. |
| 4,600,319 | A | 7/1986 | Everett, Jr. |
| 5,375,216 | A | 12/1994 | Moyer et al. |

(Continued)

FOREIGN PATENT DOCUMENTS

| | | |
|---|---|---|
| WO | WO 98/36532 A1 | 8/1998 |
| WO | WO 02/084920 A2 | 10/2002 |

OTHER PUBLICATIONS

PCI Technology Overview, Feb. 2003, www.cs.unc.edu/Research/stc/FAQs/pcioverview. pdf, 22 pp.

(Continued)

*Primary Examiner* — Andrew Oh
(74) *Attorney, Agent, or Firm* — Shumaker & Sieffert, P.A.

(57) ABSTRACT

A multi-router system is described in which hardware and software components of one or more standalone routers can be partitioned into multiple logical routers. The multiple logical routers are isolated from each other in terms of routing and forwarding functions yet allow network interfaces to be shared between the logical routers. Moreover, different logical routers can share network interfaces without impacting the ability of any of the logical routers to be independently scaled to meet the bandwidth demands of the customers serviced by the logical router.

15 Claims, 5 Drawing Sheets

(56) References Cited

U.S. PATENT DOCUMENTS

| | | | |
|---|---|---|---|
| 5,408,539 A | 4/1995 | Finlay et al. | |
| 5,490,252 A | 2/1996 | Macera et al. | |
| 5,509,123 A | 4/1996 | Dobbins et al. | |
| 5,530,958 A | 6/1996 | Agarwal et al. | |
| 5,568,471 A | 10/1996 | Hershey et al. | |
| 6,011,795 A | 1/2000 | Varghese et al. | |
| 6,018,765 A | 1/2000 | Durana et al. | |
| 6,148,335 A | 11/2000 | Haggard et al. | |
| 6,148,765 A | 11/2000 | Lilleland et al. | |
| 6,182,146 B1 | 1/2001 | Graham-Cumming, Jr. | |
| 6,226,748 B1 * | 5/2001 | Bots | H04L 12/46 713/153 |
| 6,321,338 B1 | 11/2001 | Porras et al. | |
| 6,392,996 B1 | 5/2002 | Hjalmtysson | |
| 6,499,088 B1 | 12/2002 | Wexler et al. | |
| 6,501,752 B1 | 12/2002 | Kung et al. | |
| 6,563,796 B1 | 5/2003 | Saito | |
| 6,584,548 B1 | 6/2003 | Bourne et al. | |
| 6,590,898 B1 | 7/2003 | Uzun | |
| 6,594,268 B1 | 7/2003 | Aukia et al. | |
| 6,598,034 B1 | 7/2003 | Kloth | |
| 6,651,098 B1 | 11/2003 | Carroll et al. | |
| 6,735,201 B1 | 5/2004 | Mahajan et al. | |
| 6,751,663 B1 | 6/2004 | Farrell et al. | |
| 6,807,523 B1 | 10/2004 | Wensink et al. | |
| 6,826,713 B1 | 11/2004 | Beesley et al. | |
| 6,870,817 B2 | 3/2005 | Dolinar et al. | |
| 6,889,181 B2 | 5/2005 | Kerr et al. | |
| 6,910,148 B1 | 6/2005 | Ho et al. | |
| 6,970,943 B1 | 11/2005 | Subramanian et al. | |
| 6,973,066 B2 * | 12/2005 | Gutowski | H04B 1/7097 370/335 |
| 6,975,628 B2 | 12/2005 | Johnson et al. | |
| 6,983,294 B2 | 1/2006 | Jones et al. | |
| 6,985,956 B2 | 1/2006 | Luke et al. | |
| 7,031,304 B1 | 4/2006 | Arberg et al. | |
| 7,055,174 B1 | 5/2006 | Cope et al. | |
| 7,058,974 B1 | 6/2006 | Maher, III et al. | |
| 7,099,669 B2 * | 8/2006 | Sheffield | H04W 24/08 455/423 |
| 7,114,008 B2 | 9/2006 | Jungck et al. | |
| 7,117,241 B2 | 10/2006 | Bloch et al. | |
| 7,120,931 B1 | 10/2006 | Cheriton | |
| 7,139,242 B2 | 11/2006 | Bays | |
| 7,185,103 B1 | 2/2007 | Jain | |
| 7,185,368 B2 | 2/2007 | Copeland, III | |
| 7,203,740 B1 | 4/2007 | Putzolu et al. | |
| 7,231,459 B2 | 6/2007 | Saraph et al. | |
| 7,251,215 B1 | 7/2007 | Turner et al. | |
| 7,254,114 B1 | 8/2007 | Turner et al. | |
| 7,263,091 B1 * | 8/2007 | Woo et al. | 370/351 |
| 7,292,573 B2 | 11/2007 | LaVinge et al. | |
| 7,313,100 B1 | 12/2007 | Turner et al. | |
| 7,318,179 B1 | 1/2008 | Fernandes | |
| 7,362,763 B2 | 4/2008 | Wybenga et al. | |
| 7,369,557 B1 | 5/2008 | Sinha | |
| 7,376,125 B1 | 5/2008 | Hussain et al. | |
| 7,383,541 B1 * | 6/2008 | Banks | G06F 8/65 717/126 |
| 7,386,108 B1 | 6/2008 | Zave et al. | |
| 7,406,030 B1 | 7/2008 | Rijsman | |
| 7,420,929 B1 | 9/2008 | Mackie | |
| 7,433,966 B2 | 10/2008 | Charny et al. | |
| 7,443,805 B1 * | 10/2008 | Bynum | H04L 41/0816 370/254 |
| 7,492,713 B1 | 2/2009 | Turner et al. | |
| 7,496,650 B1 | 2/2009 | Previdi et al. | |
| 7,496,955 B2 | 2/2009 | Akundi et al. | |
| 7,561,569 B2 | 7/2009 | Thiede | |
| 7,580,356 B1 | 8/2009 | Mishra et al. | |
| 7,606,241 B1 * | 10/2009 | Raghunathan | H04L 41/0803 370/389 |
| 7,630,358 B1 * | 12/2009 | Lakhani | H04L 45/586 370/351 |
| 7,633,944 B1 | 12/2009 | Chang et al. | |
| 7,660,265 B2 * | 2/2010 | Kreuk | H04L 63/0272 370/254 |
| 7,664,855 B1 | 2/2010 | Freed et al. | |
| 7,738,396 B1 | 6/2010 | Turner et al. | |
| 7,747,737 B1 | 6/2010 | Apte et al. | |
| 7,802,000 B1 * | 9/2010 | Huang | G06F 9/5077 455/404.2 |
| 7,809,827 B1 | 10/2010 | Apte et al. | |
| 7,856,014 B2 | 12/2010 | Kreuk | |
| 7,869,352 B1 | 1/2011 | Turner et al. | |
| 8,031,715 B1 | 10/2011 | Chang et al. | |
| 8,037,175 B1 | 10/2011 | Apte et al. | |
| 8,089,895 B1 | 1/2012 | Mackie | |
| 8,340,090 B1 * | 12/2012 | Bettink et al. | 370/389 |
| 8,369,345 B1 * | 2/2013 | Raghunathan et al. | 370/397 |
| 9,032,095 B1 * | 5/2015 | Traina | H04L 29/06 370/389 |
| 2002/0095492 A1 | 7/2002 | Kaashoek et al. | |
| 2002/0126621 A1 | 9/2002 | Johnson et al. | |
| 2002/0141343 A1 | 10/2002 | Bays et al. | |
| 2002/0163932 A1 | 11/2002 | Fischer et al. | |
| 2003/0005145 A1 | 1/2003 | Bullard | |
| 2003/0051048 A1 * | 3/2003 | Watson | H04L 45/00 709/238 |
| 2003/0097557 A1 | 5/2003 | Tarquini et al. | |
| 2003/0105851 A1 * | 6/2003 | Metzger | G06F 13/387 709/223 |
| 2003/0106067 A1 * | 6/2003 | Hoskins | H04L 12/2801 725/119 |
| 2003/0120769 A1 | 6/2003 | McCollom et al. | |
| 2003/0145232 A1 | 7/2003 | Poletto et al. | |
| 2003/0165144 A1 * | 9/2003 | Wang | H04L 45/586 370/400 |
| 2003/0169747 A1 | 9/2003 | Wang | |
| 2003/0214913 A1 | 11/2003 | Kan et al. | |
| 2003/0223361 A1 | 12/2003 | Hussain et al. | |
| 2003/0228147 A1 | 12/2003 | Brahim | |
| 2004/0037279 A1 * | 2/2004 | Zelig | H04L 12/1836 370/390 |
| 2004/0059831 A1 | 3/2004 | Chu et al. | |
| 2004/0066782 A1 | 4/2004 | Nassar et al. | |
| 2004/0153573 A1 * | 8/2004 | Kim | H04L 45/04 709/242 |
| 2004/0165581 A1 * | 8/2004 | Oogushi | H04L 12/2856 370/352 |
| 2004/0186701 A1 * | 9/2004 | Aubin | H04L 41/0896 703/13 |
| 2004/0260834 A1 | 12/2004 | Lindholm et al. | |
| 2004/0264465 A1 * | 12/2004 | Dunk | H04L 12/4633 370/392 |
| 2005/0027782 A1 * | 2/2005 | Jalan | H04L 12/1886 709/200 |
| 2005/0041665 A1 * | 2/2005 | Weyman | H04L 45/04 370/390 |
| 2005/0074009 A1 * | 4/2005 | Kanetake | H04L 49/552 370/392 |
| 2005/0088965 A1 * | 4/2005 | Atlas | H04L 45/00 370/216 |
| 2005/0160289 A1 | 7/2005 | Shay | |
| 2005/0169281 A1 * | 8/2005 | Ko | H04L 45/60 370/400 |
| 2005/0190719 A1 * | 9/2005 | Lee et al. | 370/328 |
| 2005/0257256 A1 | 11/2005 | Supnik et al. | |
| 2005/0265308 A1 * | 12/2005 | Barbir | H04L 12/4641 370/351 |
| 2006/0062206 A1 | 3/2006 | Krishnaswamy | |
| 2006/0089994 A1 | 4/2006 | Hayes | |
| 2006/0090008 A1 * | 4/2006 | Guichard | H04L 12/4633 709/246 |
| 2006/0153067 A1 * | 7/2006 | Vasseur | H04L 12/5695 370/217 |
| 2006/0168274 A1 | 7/2006 | Aloni et al. | |
| 2006/0182122 A1 * | 8/2006 | Davie et al. | 370/395.53 |
| 2006/0203820 A1 * | 9/2006 | Coluccio | H04L 12/66 370/392 |
| 2006/0268682 A1 * | 11/2006 | Vasseur | H04L 12/5695 370/216 |
| 2006/0268877 A1 * | 11/2006 | Gollamudi | H04L 45/02 370/392 |

(56) References Cited

U.S. PATENT DOCUMENTS

| | | | |
|---|---|---|---|
| 2007/0016702 A1 | 1/2007 | Pione et al. | |
| 2007/0025241 A1 | 2/2007 | Nadeau et al. | |
| 2007/0058558 A1 | 3/2007 | Cheung et al. | |
| 2007/0076658 A1 | 4/2007 | Park et al. | |
| 2007/0083672 A1 | 4/2007 | Shima et al. | |
| 2007/0086448 A1 | 4/2007 | Hu | |
| 2007/0091794 A1* | 4/2007 | Filsfils | H04L 12/66 370/228 |
| 2007/0115899 A1* | 5/2007 | Ovadia | H04W 36/24 370/338 |
| 2007/0121812 A1 | 5/2007 | Strange et al. | |
| 2007/0127382 A1 | 6/2007 | Hussain et al. | |
| 2007/0140235 A1* | 6/2007 | Aysan | H04L 45/00 370/389 |
| 2007/0162783 A1 | 7/2007 | Talaugon et al. | |
| 2007/0174685 A1* | 7/2007 | Banks et al. | 714/12 |
| 2007/0291764 A1* | 12/2007 | Wu | H04L 45/00 370/395.5 |
| 2007/0294369 A1 | 12/2007 | Ginter et al. | |
| 2008/0019383 A1* | 1/2008 | Wainwright | H04L 12/4641 370/401 |
| 2008/0043764 A1 | 2/2008 | Ishizaki et al. | |
| 2008/0049664 A1* | 2/2008 | Austin | H04W 16/18 370/328 |
| 2008/0069100 A1* | 3/2008 | Weyman | H04L 45/04 370/390 |
| 2008/0080508 A1* | 4/2008 | Das | H04L 12/4633 370/392 |
| 2008/0092229 A1* | 4/2008 | Khanna | H04L 63/164 726/15 |
| 2008/0101350 A1* | 5/2008 | Kreuk | H04L 12/4641 370/389 |
| 2008/0148386 A1* | 6/2008 | Kreuk | H04L 63/0272 726/15 |
| 2008/0151882 A1* | 6/2008 | Sanjay | H04L 45/586 370/389 |
| 2008/0159277 A1* | 7/2008 | Vobbilisetty | H04L 12/462 370/357 |
| 2008/0170578 A1 | 7/2008 | Ould-Brahim | |
| 2008/0205271 A1 | 8/2008 | Aissaoui et al. | |
| 2008/0205395 A1* | 8/2008 | Boddapati | H04L 12/1868 370/390 |
| 2008/0225852 A1* | 9/2008 | Raszuk | H04L 12/4633 370/392 |
| 2008/0285466 A1 | 11/2008 | Salam et al. | |
| 2008/0304476 A1* | 12/2008 | Pirbhai | H04L 12/66 370/356 |
| 2008/0310433 A1* | 12/2008 | Retana | H04L 45/02 370/401 |
| 2009/0031041 A1 | 1/2009 | Clemmensen | |
| 2009/0041038 A1 | 2/2009 | Martini et al. | |
| 2009/0092137 A1* | 4/2009 | Haigh et al. | 370/392 |
| 2009/0129385 A1* | 5/2009 | Wray | H04L 12/4633 370/392 |
| 2009/0175280 A1 | 7/2009 | Berechya et al. | |
| 2009/0185506 A1 | 7/2009 | Watson et al. | |
| 2010/0046531 A1* | 2/2010 | Louati et al. | 370/401 |
| 2010/0061380 A1 | 3/2010 | Barach et al. | |
| 2010/0202295 A1 | 8/2010 | Smith et al. | |
| 2010/0214913 A1 | 8/2010 | Kompella | |
| 2010/0272110 A1 | 10/2010 | Allan et al. | |
| 2010/0309907 A1 | 12/2010 | Proulx et al. | |
| 2011/0075664 A1 | 3/2011 | Lambeth et al. | |
| 2011/0119748 A1* | 5/2011 | Edwards | G06F 9/5077 726/12 |

OTHER PUBLICATIONS

"The CAIDA Web Site," www.caida.org/, 2002, 1 pg.
"About Endace," www.endace.com/, 2002, 1 pg.
"Cisco IOS NetFlow," www.cisco.com/warp/public/732/Tech/nmp/netflow/index.shtml, 2002, 1 pg.
Weaver, A.C. et al., "A Real-Time Monitor for Token Ring Networks," Military Communications Conference, 1989, MILCOM '89, Oct. 1989, vol. 3, pp. 794-798.
Dini, P. et al., "Performance Evaluation for Distributed System Components," Proceedings of IEEE Second International Workshop on Systems Management, Jun. 1996, pp. 20-29.
Integrated Services Adapter, 2000, Cisco Systems, Data Sheet, pp. 1-6, http://www.cisco.com/warp/public/cc/pd/ifaa/svaa/iasvaa/prodlit/ism2_ds.pdf.
"Well-Known TCP Port Number," www.webopedia.com, 2004, 3 pgs.
"TCP Packet Field Descriptions," www.ipanalyser.co.uk, Analyser Sales Ltd., Copyright 2003, 2 pages.
Michael Egan, "Decomposition of a TCP Packet," www.passwall.com, 3 pages, Aug. 7, 2000.
Mark Gibbs, "A Guide to Original SYN," www.nwfusion.com, Network World, Nov. 2000, 4 pages.
"Sample TCP/IP Packet," www.passwall.com, Version 0.0.0 @ 03:55/Aug. 7, 2000, Copyright 2002, 6 pp.
D.J. Bernstein, "SYN Cookies," http://cr.yp.to/syncookies.html, Oct. 2003, 3 pages.
Jonathan Lemon, "Resisting SYN Flood DoS Attacks with a SYN Cache," http://people.freebsd.org/~jlemon/papers/syncache.pdf, 9 pages.
Stuart Staniford, et al., "Practical Automated Detection of Stealthy Portscans," http://downloads.securityfocus.com/library/spice-ccs2000.pdf, 16 pages.
Juniper Networks, Inc., "Combating Bots and Mitigating DDos Attacks," Juniper Networks, Inc. 2008, Entire document, http://www.juniper.net/solutions/literature/solutionbriefs/351198.pdf.
U.S. Appl. No. 12/897,530, by Manoj Apte, filed Oct. 4, 2010.

* cited by examiner

MULTI-ROUTER SYSTEM HAVING SHARED NETWORK INTERFACES

This application is a continuation of U.S. application Ser. No. 12/618,536, filed Nov. 13, 2009, the entire content of which is incorporated herein by reference.

TECHNICAL FIELD

The invention relates to computer networks and, more particularly, to routing packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

A variety of routers exist within the Internet. Network Service Providers (NSPs), for example, maintain "edge routers" to provide Internet access and other services to the customers. Examples of services that the NSP may provide include Voice over IP (VOIP), access for Asynchronous Transfer Mode (ATM) or frame relay communications, Internet protocol (IP) data services, and multimedia services, such as video streaming. The edge routers of the NSPs often communicate network traffic to high-speed "core routers," which may be generally viewed as forming the backbone of the Internet. These core routers often include substantially more processing resources than the edge routers, and are designed to handle high volumes of network traffic.

NSPs often desire to isolate the forwarding functions and other networks services for customers from one another for purposes of reliability and security. As a result, in some environments an NSP may implement many dedicated routers and other networking devices for each different enterprise customer. However, the complexities associated with maintenance and management of separate routers and other networking equipment can be significant.

To address these concerns, some conventional routers allow an NSP to configure and operate multiple logical software routers within the same physical routing device. These software routers are logically isolated in the sense that they achieve operational and organizational isolation within the routing device without requiring the use of additional or redundant hardware, e.g., additional hardware-based routing controllers. That is, the software routers share the hardware components of the physical routing device, such as the packet forwarding engine and interface cards. However, this solution has limitations and may be undesirable in certain situations. For example, multiple software routers executing within the same physical routing system have scaling limitations as each software logical router is affected by the scaling requirements of every other software logical router in the system. That is, since the software routers share the same hardware, kernel, and forwarding components, any increase in state (e.g., routing information and forwarding tables) for one of the software routers may degrade the performance of the other software routers. Thus, the software routers cannot be scaled independently from one another as the needs of one customer grows while the needs of the other customers may remain unchanged. Software logical routers have other limitations such as fate sharing of the common kernel and forwarding components, and the limitation that the routers must inherently use the same version of any shared hardware or software component.

SUMMARY

In general, a multi-router system is described in which hardware and software components of one or more standalone routers can be partitioned into multiple logical routers. The multiple logical routers are isolated from each other in terms of routing and forwarding functions yet allow network interfaces to be shared between the logical routers. Moreover, different logical routers can share network interfaces without impacting the ability of any of the logical routers to be independently scaled to meet the bandwidth demands of the customers serviced by the logical router.

In one example, one or more standalone routers are physically coupled to a control system that provides a plurality of hardware-independent routing engines. The forwarding components (e.g., packet forwarding engines and interface cards) of the standalone routers are logically partitioned into multiple groups, and each group is assigned to a different one of the routing engines of the control system to form a separate "protected system domain" (PSD). Each of the PSDs operates and participates as a different standalone router within the network. Each of the PSDs, for example, participates in separate peering sessions with other routers to exchange routing information and maintain separate forwarding information. Each PSD thus provides the same "look and feel" of a physical router with its own dedicated resources and configuration data, and is administered as a separate router from other PSDs.

Each PSD exclusively controls the set of interface cards assigned to its partition, where each of the interface cards typically have one or more physical network interfaces (ports). This allows a standalone router to be partitioned into PSDs for use by multiple administrative entities or organizations with little need for coordination between the entities while continuing to be fully isolated from each other.

The routing engine of the standalone router is referred to as a "root system domain" (RSD) and maintains control over any remaining forwarding components of the standalone router that are not assigned to one of the PSDs. Moreover, any network interface card and its network ports not assigned to a PSD is controlled exclusively by the RSD of that standalone router and may be designated as a shared interface that is reachable by different PSDs at the logical interface layer. The shared network interfaces may be implemented through the use of tunnel interface cards installed within the standalone router and assigned to the PSDs that utilize a shared interface of an RSD. For each PSD, one or more logical tunnel interfaces are assigned to the tunnel interface card of that PSD, and the logical tunnel interfaces appear in the routing table of that PSD as fully-routable ingress and egress interfaces. At the RSD, multiple logical interfaces may be defined for the same shared physical interface, and each logical interface may be assigned to a different PSD. The tunnel interface card of each PSD may be used to establish a layer two (L2) pseudo-wire connection within the standalone router that terminates at the shared interface card. All layer-three (L3) route data and next hop forwarding information may be kept local to the PSDs. This allows different PSDs, optionally running different software versions, to share an interface card without having to share routing and forwarding state. Other embodiments need not use a tunnel interface card as the functions ascribed thereto may be integrated into a packet forwarding engine or other component of the standalone router.

In one example embodiment, a multi-router system comprises at least one standalone router. The standalone router comprises a routing engine, a plurality of packet forwarding engine to forward network packets in accordance with forwarding information, and a set of network interface cards coupled to each of the packet forwarding engines by a switch fabric that forwards packets between the plurality of packet forwarding engines of the standalone router. The standalone router further includes at least two tunnel interface cards to form network tunnels. A control system comprising a plurality of routing engines is coupled to the standalone router. Each of the routing engines of the control system is associated with a different partition of the packet forwarding engines and the network interface cards of the standalone router, including at least one of the tunnel interface cards, to form a plurality of hardware logical routers. At least two of the plurality of hardware logical routers are configured to communicate with a shared one of the interface cards of the standalone router via the tunnel interface cards.

In another example embodiment, a method comprises partitioning forwarding components of a standalone router into a first group, a second group and a remaining group. Each of the first and second groups of the forwarding components of the standalone router includes a packet forwarding engine coupled to a set of physical interfaces and a tunnel interface card. The remaining group of the forwarding components of the standalone router includes at least one shared network interface. The method further comprises associating each of the first and second groups of forwarding components with a respective routing engine of a control system to form a plurality of hardware logical routers, and, with the tunnel interface cards, communicating packets between the forwarding components of the hardware logical routers and the shared interface of the standalone router by one or more tunnels internal to the standalone router.

Embodiments of the invention may provide one or more advantages. For example, the described techniques allow one or more standalone router to be partitioned into separate, isolated logical routers that do not share the same fate with respect to any routing protocols, operating system kernel, or forwarding engine. The logical routers may maintain hardware and software isolation from each other, can run different software versions, which can be upgraded independently of each other and administered separately.

Moreover, the techniques described herein allow the logical routers to share network interfaces without impacting the ability of any of the logical routers to be independently scaled to meet the bandwidth demands of the customers serviced by the logical router. For example, each of the PSDs can scale to the capacity of a complete standalone router without impacting the performance of the other logical routers. Further, forwarding tables associated with any given PSD are maintained only by resources associated with that PSD. Therefore, growth in the forwarding tables for one PSD (e.g., the addition of thousands of routes to one PSD) does not impact the performance and scalability of the other PSDs even though the PSDs may be logical partitions of the same standalone router. For example, the RSD of the standalone router does not need to maintain any routing information or forwarding tables for any of the PSDs that are associated with components of the RSD or that share network interfaces owned by that RSD even though the RSD is able to send and receive packets through the shared interface on behalf of the PSDs. In this way, the techniques described herein may reduce the amount of forwarding state that need be shared between PSDs and RSD.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
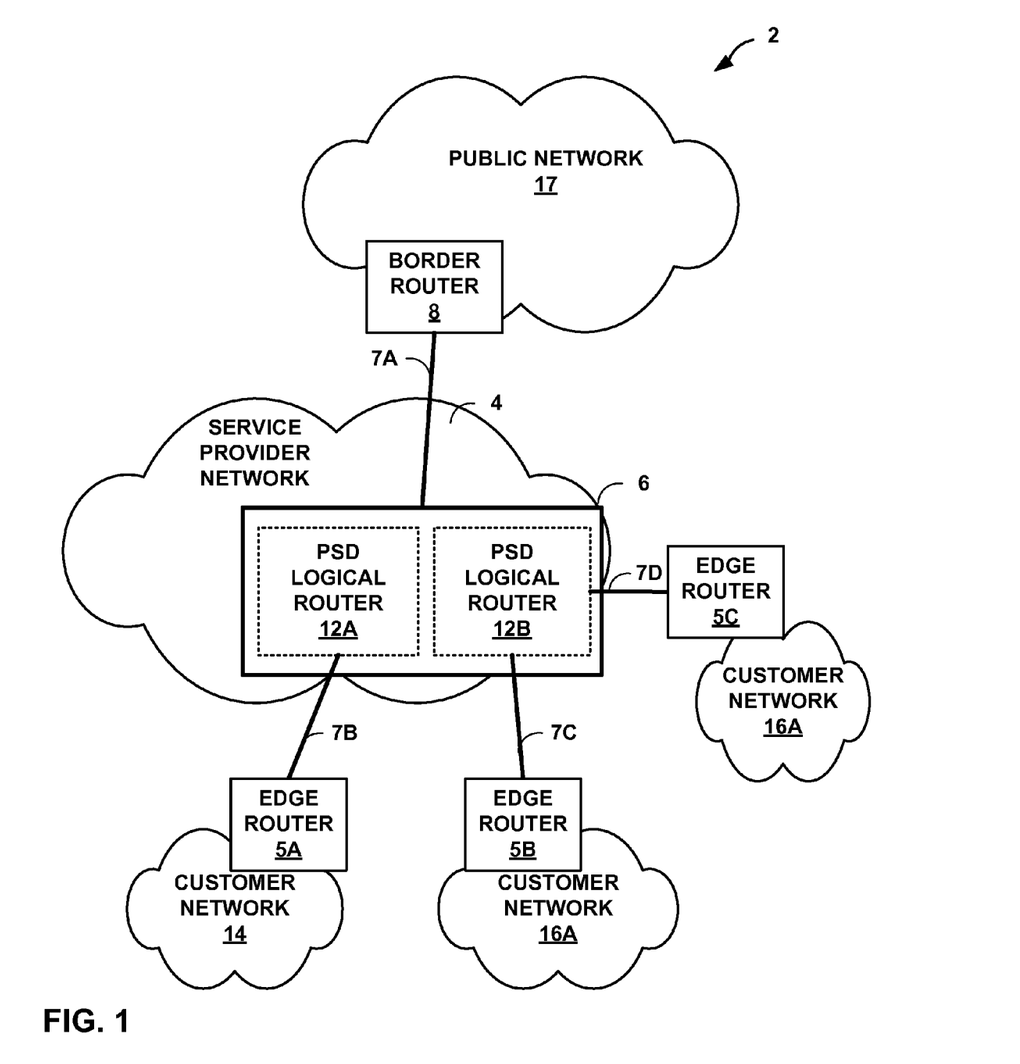
FIG. 1 is block diagram of an example computing environment in which a service-provider network includes one or more stand-alone routers that have been partitioned into multiple protected system domains (PSDs) that operate as independent logical routers.

FIG. 1 is a block diagram illustrating an example network environment 2 in which service provider network 4 includes a multi-router system 6. In this example, multi-router system 6 includes one or more stand-alone routers that have been partitioned into multiple protected system domains (PSDs) that operate as independent logical routers 12A, 12B ("PSD logical routers 12"). Each of the PSD logical routers 12 operates and participates as a different standalone router within network environment 2. Each of the PSD logical routers 12, for example, participates in separate routing sessions with other routers to exchange routing information and maintain separate forwarding information.

For purposes of example, the principles of the invention are described with respect to a simplified network environment 2 of FIG. 1. In this example, PSD logical router 12A communicates with edge router 5A via link 7B to provide customer networks 14 access to public network 17, which may be a collection of backbone and other service provider networks. Similarly, PSD logical router 12B communicates with edge routers 5B, 5C via links 7C, 7D to provide customer networks 16A, 16B access to public network 17, where customer networks 16A, 16B may, for example, be geographically separate networks associated with the same enterprise. Each of PSD logical routers 12A, 12B may exchange routing information with customer edge routers 5 to which they are coupled in order to maintain an accurate representation of the topology of network environment 2 and the respective customer networks 14, 16. Customer networks 14, 16 may include one or more computing devices (not shown), such as personal computers, laptop computers, handheld computers, workstations, servers, switches, printers, customer data centers or other devices. The configuration of network environment 2 illustrated in FIG. 1 is merely exemplary. For example, service provider network 6 may be coupled to any number of customer networks. Nonetheless, for ease of description, only customer networks 14, 16 are illustrated in FIG. 1.

In this way, service provider network 4 may thus form part of a large-scale public network infrastructure, e.g., the Internet. Consequently, customer networks 14, 16 may be viewed as edge networks of the Internet. Service provider network 4 may provide computing devices within customer networks 14, 16 with access to the Internet and may provide other network services. Examples of services that PSD logical routers 12 may provide include, for example, Voice over IP (VOIP), access for Asynchronous Transfer Mode (ATM) or frame relay communications, Internet protocol (IP) data services, and multimedia distribution services, such as video streaming. End users within customer networks 14, 16 access PSD logical routers 12 with computing devices or other network-enabled devices. In some cases the end users may not be associated with large enterprises but instead may access service provider network 4 via cable modems, digital subscriber line (DSL) modems or other network access devices. In another example, service provider network 4 and multi-router system 6 may provide network services within the core of the Internet and may not be directly coupled to customer networks. In either case, service provider network 6 may include a variety of network devices (not shown) other than multi-chassis router 4 and edge routers 5, such as additional routers, switches, servers, or other devices.

Although PSD logical routers 12 are implemented on one or more partitioned standalone routers, the PSD logical routers are isolated from each other in terms of routing and forwarding components yet allow network interfaces to be shared between the logical routers. In the example of FIG. 1, PSD logical routers 12 share a network interface of multi-router system 6 to exchange packets with border router 8 of public network 17 via link 7A. To peer edge routers 5 and border router 8 of network environment 2, PSD logical routers 12 appear as separate routing devices within the topology of the network and are associated with separate network addresses. Nevertheless, as described herein, PSD logical routers 12 share the network interface coupled to link 7A.

As described in further detail below, multi-router system 6 includes one or more standalone routers that are physically coupled to a management system that provides a plurality of hardware-independent routing engines. Each of the standalone routers may include a forwarding engine and interface cards that can be logically partitioned into multiple groups, and each group is assigned to a different one of the routing engines of the control system to form PSD logical routers 12. The routing engine of the standalone router is referred to as a "root system domain" (RSD) and maintains control over any remaining forwarding components of the standalone router that are not assigned to either of PSD logical routers 12. In this way, the one or more standalone routers may be partitioned into separate, isolated PSD logical routers 12 that do not share the same fate with respect to any routing protocols, operating system kernel, or forwarding engine. PSD logical routers 12 maintain hardware and software isolation from each other, can run different software versions, and can be administered independently.

In accordance with techniques described herein, each of PSD logical routers 12 exclusively controls a set of interface cards assigned to its partition, each of the interface cards having one or more network interfaces (ports). In this example, PSD logical router 12A exclusively owns a set of interface cards having network interfaces (ports), including a network interface for communicating with edge router 5A via link 7B. Similarly, PSD logical router 12B exclusively owns a set of interface cards having network interfaces, including network interfaces for communicating with edge routers 5B, 5C via links 7C, 7D, respectively. Any network interface card and its network ports not assigned to either of PSD logical routers 12 is controlled exclusively by the RSD of that standalone router and may be designated as a shared interface that is reachable by different PSDs at the logical interface layer. Thus, in the example of FIG. 1, multi-router system 6 includes an RSD for the at least one stand-alone router that has been partitioned to form PSD logical routers 12, and the RSD maintains exclusive ownership and control over the interface card and network interface for reaching border router 8 via link 7A.

As described herein, the techniques allow PSD logical routers 12 to share network interfaces without impacting the ability of each of the PSD logical routers to be independently scaled to meet the bandwidth demands of the respective customer networks 14, 16 serviced by the logical router. For example, each of the PSD logical routers 12 can in theory scale to the same capacity to which a similarly configured standalone router could scale without impacting the performance of the other PSD logical router. For example, a routing information base and forwarding tables associated with each of the PSD logical routers 12 are maintained only by resources exclusively associated with that PSD. Therefore, in the event the demands and size of customer networks 16 significantly increases, any growth in the forwarding tables and bandwidth consumption for PSD logical router 12B does not impact the performance and scalability of PSD logical router 12A even though the PSD logical routers may be logical partitions of the same standalone router and share at least one network interface, i.e., the network interface to reach border router 8 in this example.

Figure 2:
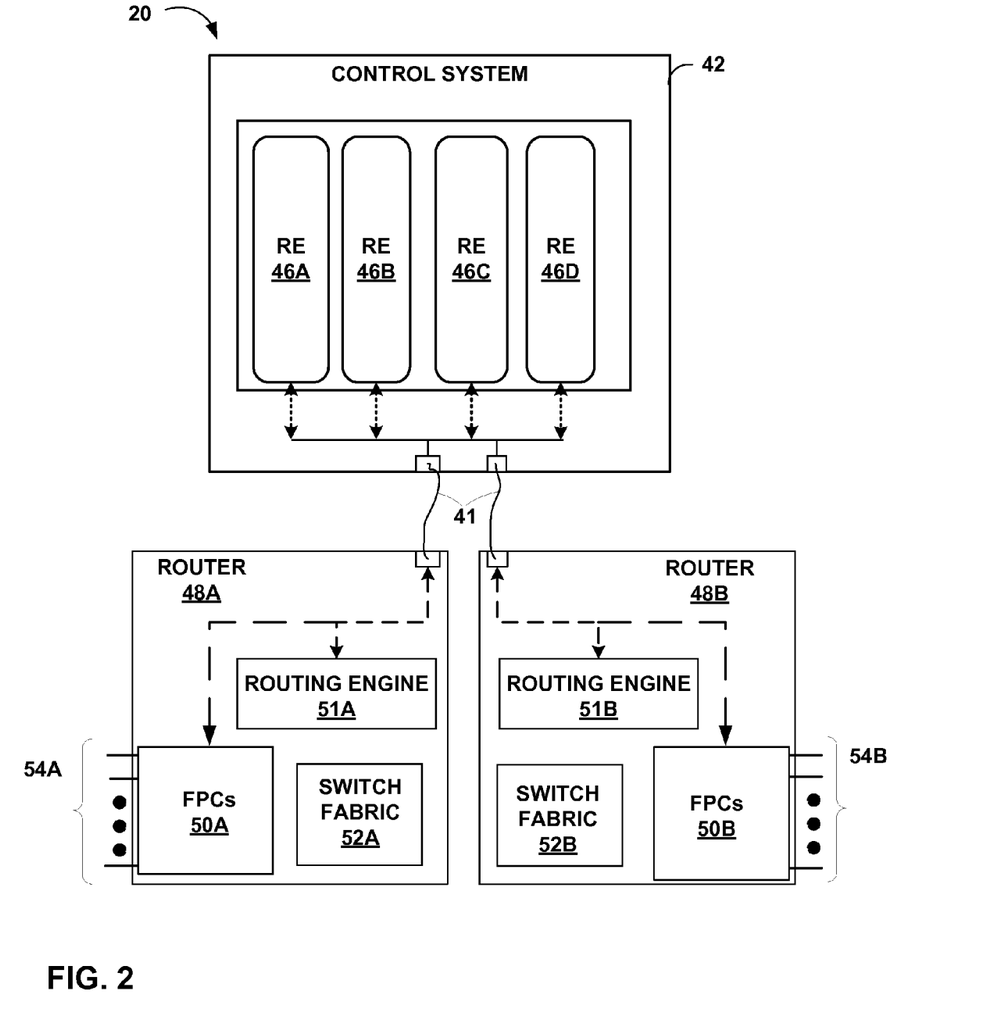
FIG. 2 is a block diagram illustrating an exemplary multi-router system in which two standalone routers have been partitioned into four independent logical routers.

FIG. 2 is a block diagram illustrating an exemplary multi-router system 20 in which two standalone routers have been partitioned into four independent logical routers. Multi-router system 40 may, for example, represent an illustration of multi-router system 6 of FIG. 1 in further detail.

As shown in FIG. 2, multi-router system 20 includes a control system 42 that provides on operating environment for four routing engines 46A_46D ("REs 46"). In one embodiment, control system 42 may comprise a separate, external chassis having a computing backplane into which four or more physically separate computing blades may be inserted. Each computing blade comprises a processor-based operating environment for an operating system and software processes, such as routing processes, chassis configuration process, and other processes for implementing the control plane of a router.

In this example, control system 42 includes two high-speed communications ports (e.g., optical Ethernet ports) that connect the control system to two substantially similar standalone routers 48A-48B ("routers 48"). In this way, each of REs 46 may communicate with routing engines 51A-51B ("routing engines 51") and other components of standalone routers 48. In other embodiments, a multi-router system may include fewer (e.g., one) or more standalone routers connected to control system 42.

Standalone routers 48 each include a routing engine 51 that provides full control-plane operations when operating as a standalone router. In this example, each of routers 48 may each be configured with a set of flexible packet interface card concentrators (FPCs) 50, each of which may include a packet forwarding engine (PFE) and a set of one or more individual interface cards (IFCs) (not shown) for inbound and outbound network communication via network links 54. Each of routers 48 also contains electronics for implementing an internal switch fabric 52 that provides a switching mechanism between the packet forwarding engines of the FPCs internal to the respective router. For example, router 48A includes internal switch fabric 52A as a switching mechanism between interface cards of FPCs 50A. Similarly, router 48B includes internal switch fabric 52B as a switching mechanism between interface cards of FPCs 50B. Although routers 48 are coupled to control system 42 for control plane communications, transit network packets typically cannot be directly and internally forwarded between routers 48. Each of switch fabrics 52 may be implemented as a multi-stage switch fabric or as a full-mesh, single-stage switch fabric.

By way of example, multi-router system 20 and standalone routers 48 may be partitioned into four protected system domains (PSDs) that each operate as an independent hardware logical router. That is, FPCs 50 may be individually assigned to a different one of the four PSDs, and each of the four PSDs exclusively owns the interface cards of the FPCs assigned to the PSD. Each of routing engines 46 of control system 42 is assigned to a different PSD and controls packet forwarding functions for the PSD. For example, routing protocols executing on each routing engine 46 communicate with other routers within the network via routing sessions to exchange topology information and learn routing information for the network. For example, the routing information may include route data that describes various routes through the network, and also next hop data indicating appropriate neighboring devices within the network for each of the routes. Example routing protocols include the Border Gateway Protocol (BGP), the Intermediate System to Intermediate System (ISIS) protocol, the Open Shortest Path First (OSPF) protocol, and the Routing Information Protocol (RIP). Each routing engine 46 maintains separate routing information using the hardware resources of control system 42, e.g., a separate computing blade, so as to achieve software and hardware isolation. Routing engines 46 update their respective routing information to accurately reflect the current network topology.

Routing engines 46 also use the routing information to derive forwarding information bases (FIBs) for the respective PSDs to which the routing engine is assigned. Each of routing engines 46 installs the FIBs in each of FPCs 50 that are logically assigned to its PSD. In this way, each FPC 50 only includes forwarding state for the PSD to which it is assigned. Thus, a FIB for one of FPCs 50A may be the same or different than a FIB for a different one of the FPCs for router 48A if the FPCs are assigned to different PSDs. Routing engines 46 may communicate with FPCs 50 via cables 41 to coordinate direct FIB installation on the standalone routers 48 using inter-process communications (IPCs) or other communication techniques. Because cables 41 provide a dedicated connection, i.e., separate from a data packet forwarding connection provided by switch fabrics 52, FIBs in FPCs 50 can be updated without interrupting packet forwarding performance of multi-router system 20.

Each of routing engines 51 maintains control over any FPCs 50 and their interface cards that are not otherwise assigned to a PSD. For example, routing engine 51A maintains exclusive control over any of FPCs 50A of router 48 that are not assigned to any PSD. In one embodiment, routing engine 51A may still operate as an independent, standalone router within the network and may maintain routing information for any unassigned and unshared forwarding component based on its peering sessions with other routers. Moreover, routing engine 51A generates a FIB based on its locally maintained routing information and programs the FIB (forwarding information) into any of FPCs 50A that is owns due to the FPCs not being assigned to a PSD.

As described herein, the techniques allow any network interface of an RSD to be shared between PSDs of multi-router system 20 without requiring that the resources of the PSD be burdened with the forwarding information of the other PSD. Thus, network interfaces may be shared between PSDs without impacting the ability of each of the PSDs to independently scale.

Multi-router system 20 and, in particular, routers 48 may include hardware, software, firmware, and may include processors, control units, discrete hardware circuitry, or other logic for executing instructions fetched from computer-readable media, e.g., computer-readable storage media. Examples of such media include hard disks, Flash memory, random access memory (RAM), read-only memory (ROM), non-volatile random access memory (NVRAM), electrically erasable programmable read-only memory (EEPROM), flash memory, and the like.

Figure 3:
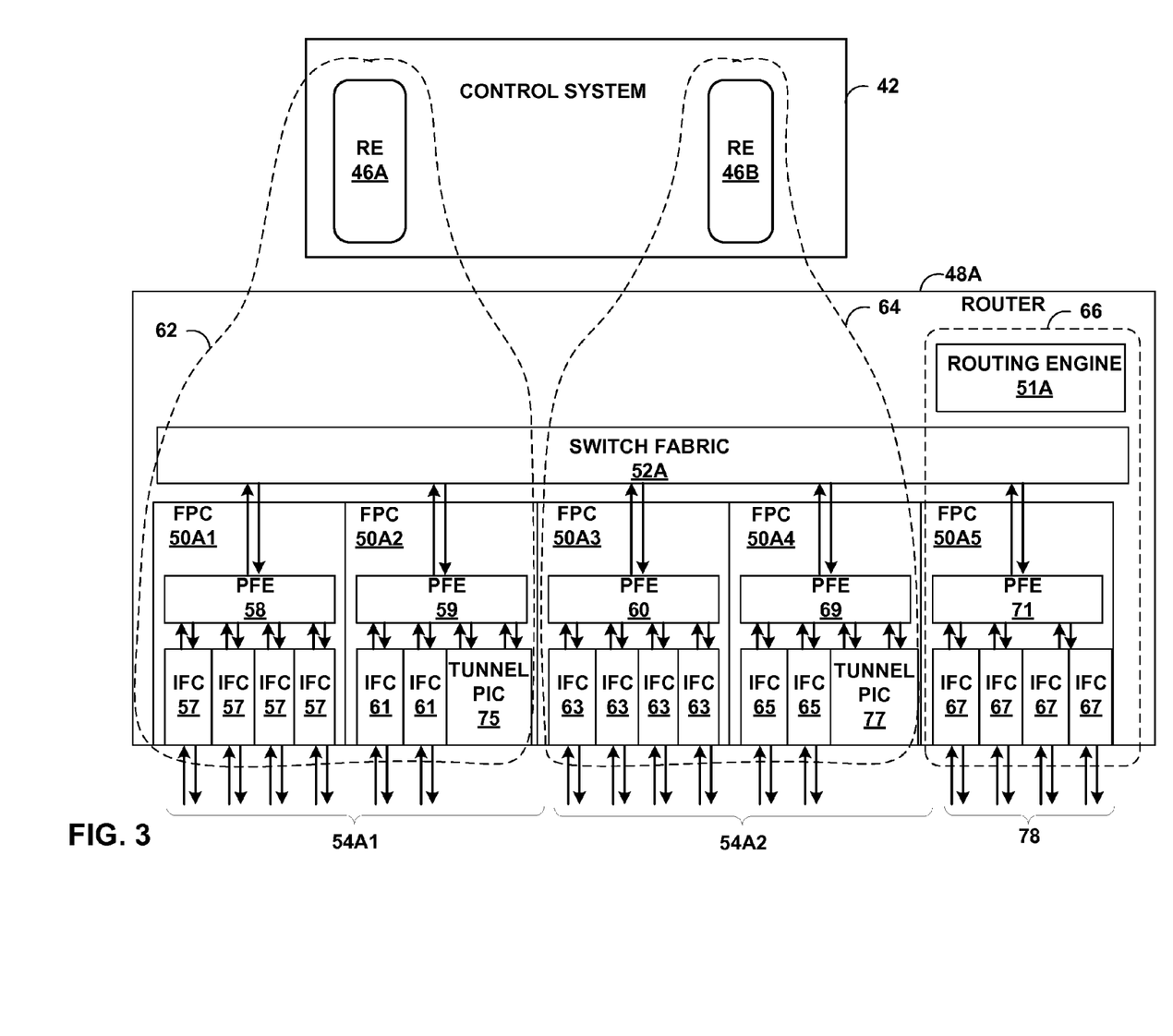
FIG. 3 is a block diagram illustrating in further detail an exemplary embodiment of the multi-router system of FIGS. 1-2

FIG. 3 is a conceptual illustration of a portion of FIG. 2 in further detail and shows an example partitioning of standalone router 48A into a first PSD 62, a second PSD 64 and a remaining RSD 66. In this example, router 48A includes five FPCs 50A1-50A5. PSD 62 is formed by assigning FPCs 50A1 and 50A2 to routing engine 46A of control system 42. In this way, PSD 62 has exclusive ownership of FPC50A1, its packet forwarding engine (PFE) 58 and its interface cards IFCs 57. In addition, PSD 62 has exclusive logical ownership of FPC 50A2, packet PFE 59, interface cards IFCs 67 and a tunnel packet interface card ("tunnel PIC") 75 that provides tunnel ingress and egress network interfaces for the PSD 62. Once configured, routing engine 51A relinquishes logical ownership of FPCs 50A1 and 50A2 and removes their respective IFCS 57, 61 and their interfaces from its forwarding information and list of available interfaces. That is, to routing engine 51A it is as if the interfaces of FPCs 50A1 and 50A2 do not locally exist and are not directly reachable.

Similarly, PSD 64 is formed by assigning FPCs 50A3 and 50A4 to routing engine 46B of control system 42. PSD 64 has exclusive ownership of FPCs 50A3, 50A43, their PFEs 60, 69, IFCs 63, 65 and tunnel PIC 77. Routing engine 51A relinquishes logical ownership of FPCs 50A3-50A4 and removes IFCS 63, 65 and their interfaces from its forwarding information and list of available interfaces.

In addition, in the example of FIG. 3, FPC 50A5 has not been assigned to a PSD and, therefore, remains under the control of local routing engine 51. Thus, root system domain (RSD) 66 is formed and includes routing engine 51 and FPC 50A5, including PFE 71 and its IFCs 67. As described herein, any physical interfaces of IFCs 67 of RSD 66 may be utilized as shared network interfaces by PSDs 62, 64. That is, both of PSDs 62, 64 can be configured to utilize any of IFCs 67 to send and receive packets via links 78. Moreover, sharing of IFCs 67 does not impact the ability of PSDs 62, 64 to independently scale. That is, the size and complexity of forwarding information maintained by PSD 62, for example, does not impact the performance of PSD 64, and vice versa, even though the PSDs share one or more network interfaces.

In one embodiment, shared interfaces of RSD 66 are realized through the use of tunnel PICs 75, 77 installed within PSDs 62, 64, respectively, in conjunction with a shared one of more network interfaces of IFCs 67 within RSD 66. Each of tunnel PICs 75, 77 in conjunction with a shared IFC 67 form endpoints of what can be viewed as a circuit-cross-connect between the PSDs and RSD across the shared switch fabric 52A in router 48A. PFEs 50A1-50A5 are uniquely numbered within standalone router 48A, identifiable across the router, and addressable from every PFE within the router. This association between a tunnel PIC 75, 77 of PSDs 62, 64 and a shared network interface of RSD 66 becomes an internal point-to-point pseudo-wire connection between the PSD and the RSD, so that, from the point of view of the PSD, the shared interface appears to be local to the PSD. Other embodiments need not use tunnel PICs as the functions ascribed thereto may be integrated into the PFEs 50 or other component of the standalone router 48A.

For example, when a network interface of IFCs 67 is designated to be a shared interface by two or more PSDs, a pseudo interface (i.e., logical interface) is created within the interface list of PSDs. For example, in one embodiment, an administrator provides configuration statements that identify the interface of IFCs 67 to be shared, the PSDs 62, 64 to share the interface, the respective logical interfaces within the PSDs to represent the shared interface, which become the endpoints of an internal tunnel used across the switch fabric. In some cases, routing engine 51A of RSD is configured to associate a plurality of logical interfaces with the same physical interface of a shared interface card 67, and each of PSDs 62, 64 may be configured with a respective logical interface that is assigned as a peer interface to one of the logical interfaces of the RSD. Using the control plane links 41, a software daemon on routing engine 51A of RSD 66 exchanges this information with a pair of software daemons on routing engines 46A, 46B of PSDs 62, 64. This information may also include forwarding information associated with the respective point-to-point pseudowire connection between RSD 66 and each of PSDs 62, 64, and may take the form of tokens for each other's use when forwarding packets through the appropriate point-to-point pseudowire to and from the shared network interface.

Figure 4:
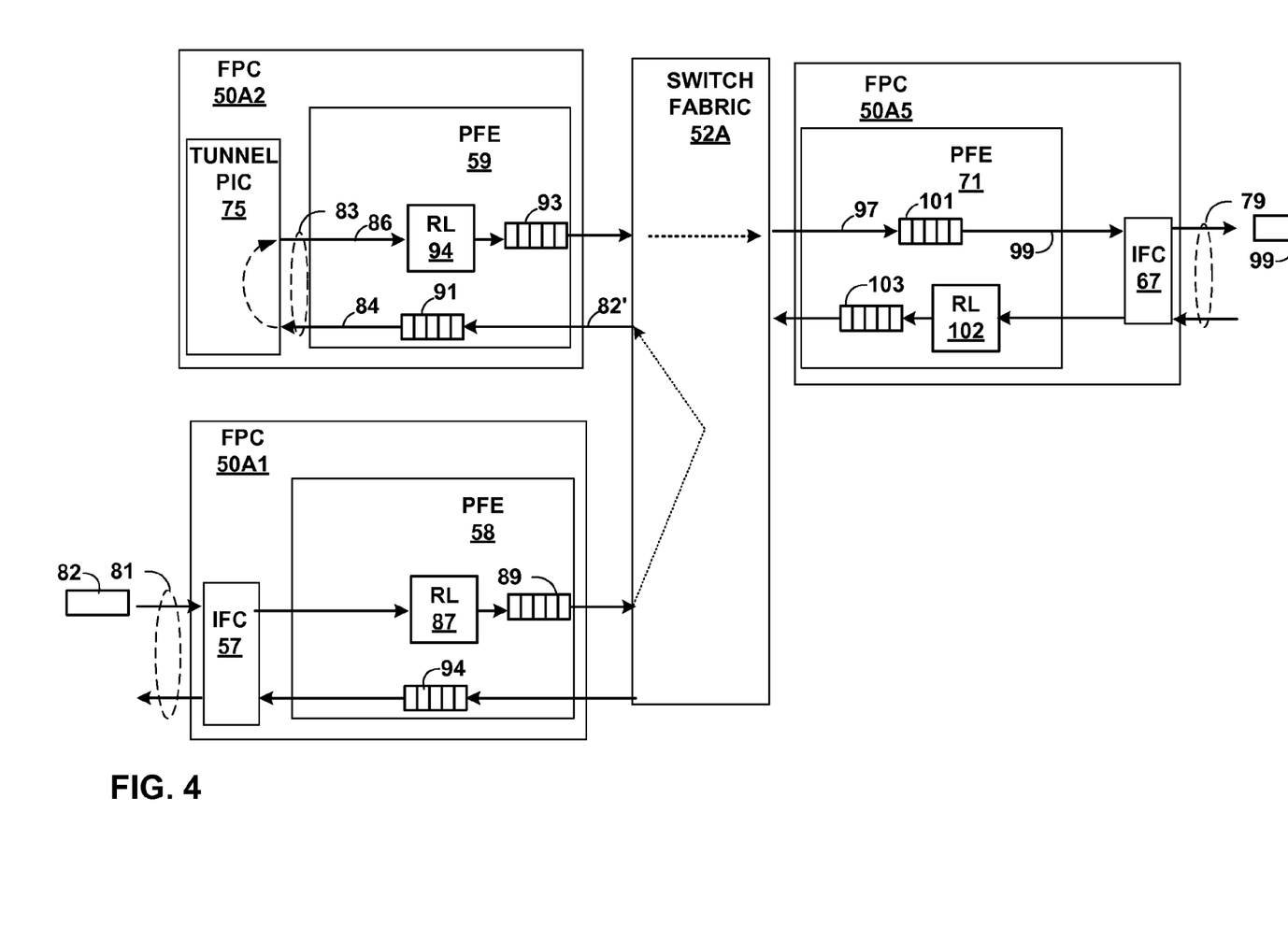
FIG. 4 is a block diagram illustrating the logical flow of packets from an ingress interface of a PSD to a shared interface of an RSD.

FIG. 4 is a block diagram illustrating the logical flow of packets from an ingress interface of a PSD to a shared interface of an RSD. For purposes of example, FIG. 4 will be explained in view of PSD 62 and RSD 66 of FIG. 3.

In the example of FIG. 4, RSD 66 includes IFC 67 having a shared network interface 79. The shared network interface 79 may be, for example, a shared synchronous optical network (sonet) optical carrier OC-192 uplink having an interface specified within RSD 66 as so-7/0/0 and configured for frame relay encapsulation. PSD 62 includes IFC having a customer-facing network interface 81, which may be an Ethernet interface logically defined within PSD 62 as ge-0/0/0. In addition, tunnel PIC 75 includes a logical tunnel interface 83, which may be logically defined as ut-1/3/0, for use with the shared network interface 79.

FIG. 4 shows the path for transit packets received at customer-facing network interface 81 to shared network interface 79. Specifically, an inbound packet 82 is received from a customer device via network interface 81. Route lookup module (RL) 87 of PFE 58 performs a route lookup on inbound packet 82 and determines that the packet must be sent over switch fabric 52A to PFE 59 that hosts logical tunnel interface 83 for PSD 62. That is, forwarding information programmed within RL 87 by RE 46A of PSD 62 maps keying information within inbound packet 82 to next hop data identifying logical tunnel interface 83 as the egress interface to which the packet must be sent. As a result, PFE 58 places inbound packet 82 within buffer 89 to be directed across switch fabric 52A to PFE 59.

PFE 59 receives outbound packet 82' from switch fabric 52A and adds L2 encapsulation needed for network interface 79, e.g., frame relay in this example. That is, PFE 59 views packet 82' as an outbound packet destined for an outbound interface and, therefore, fully forms an outbound L2 packet 84 for output to network interface 79 as if the network interface was a local network interface. In addition, when forming outbound L2 packet 84, PFE 59 adds a logical tunnel cookie to the L2 packet, where the logical tunnel cookie provides identification data associated with an internal tunnel through tunnel PIC 75. Thus, from the perspective of PFE 59, the tunnel appears similar to any other external, network tunnel having an ingress at FPC 50A2. PFE 59 places the fully-formed outbound packet 84 in packet buffer 91 for output to tunnel interface 83 as an egress interface, which is viewed as a network destination for that PSD.

Tunnel PIC 75 receives outbound packet 84 and loops the packet back to the PFE 59 as inbound packet 86. Thus, PFE 59 receives inbound packet 86 as if the packet was received from an external network tunnel that terminates at PFE 59. Thus, in other words, tunnel PIC 75 is used to receive outbound packet 84 at the tunnel ingress and loop back the tunneled packet, where the tunneled packet has a payload that encapsulates a fully-formed packet 82' destined for the shared interface 79.

PFE 59 receives inbound packet 86 from tunnel PIC 75 as an inbound packet, i.e., a packet on the PFE's network-facing inbound side as if the packet was received by router the PSD from an external tunnel. PFE 59 removes the tunnel cookie from the packet and route lookup module (RL) 94 performs a route lookup on inbound packet 86 and determines that the packet must be sent over switch fabric 52A to PFE 71 that hosts network interface 79. That is, forwarding information programmed within RL 94 by RE 46A of PSD 62 maps keying information within inbound packet 86 to next hop data identifying network interface 79 as the egress interface to which the packet must be sent. As a result, PFE 59 places inbound packet 86 within inbound packet buffer 93 to be directed across switch fabric 52A to PFE 71. Routing engine 51A of RSD 66 typically has previously communicated layer-two (L2) forwarding information to routing engine 46A of PSD 62, e.g., by way of a cross-connect peering session, where the forwarding information includes a token (connection end-point identifiers for the pseudowire) and a physical link state (e.g., up or down) of shared interface so-7/0/0. Routing engine 46A creates a mapping that associates interface so-7/0/0 with tunnel interface ut-1/3/0 and installs the mapping within RL 94. In this way, routing engines 46A and 51A create a pseudowire connection having logical tunnel interface 83 of tunnel PIC 75 and shared network interface 79 of IFC 67 as endpoints.

PFE 71 of RSD 66 receives outbound packet 97 from switch fabric 52A and places the outbound packet 99 within buffer 101 for output via out shared interface 79. No further changes need be made since the outbound packet is already fully formed for the frame relay encapsulation required by so-7/0/0, i.e., network interface 79.

Figure 5:
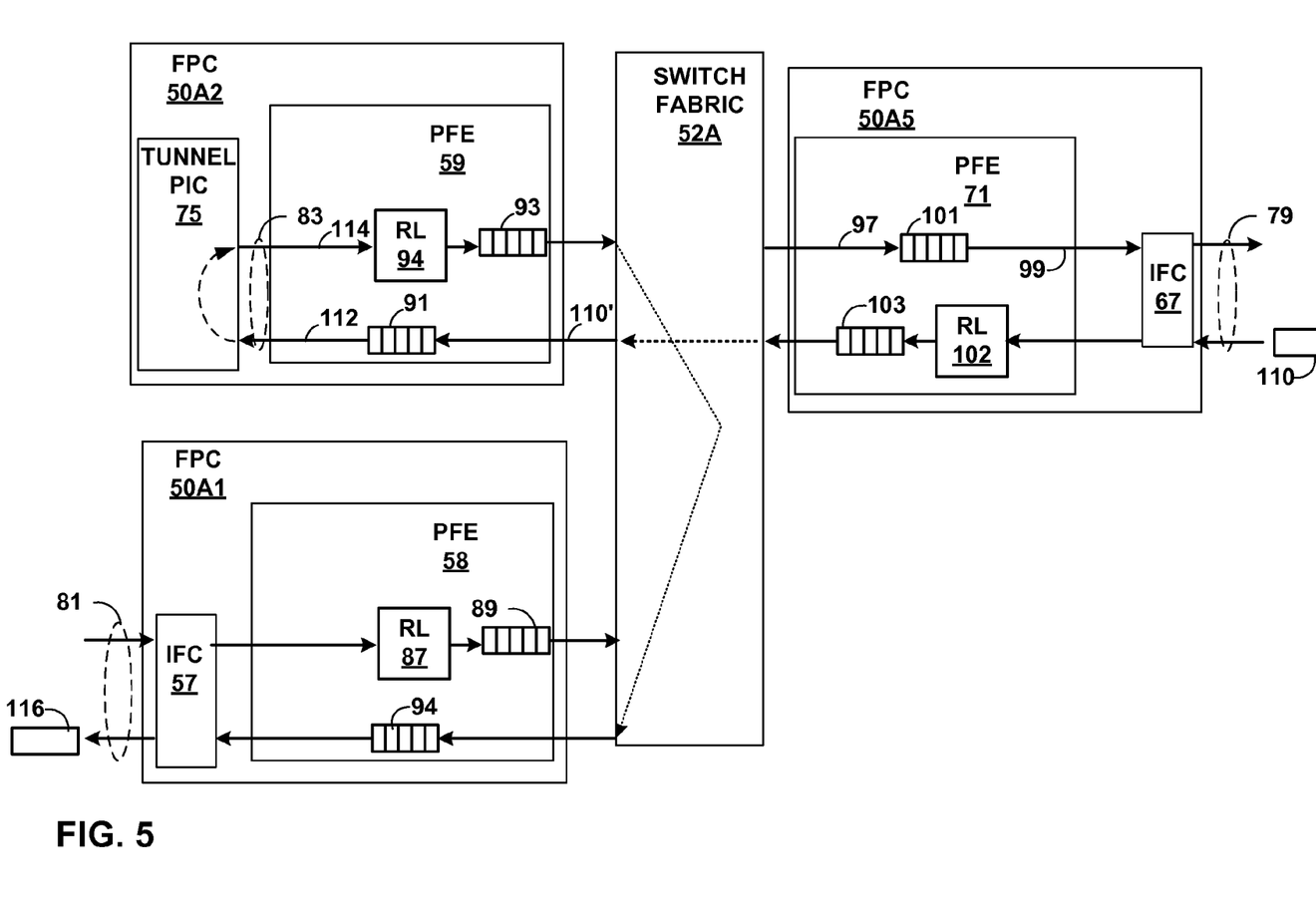
FIG. 5 is a block diagram illustrating the logical flow of packets from a shared interface of an RSD to an egress interface of a PSD.

FIG. 5 is a block diagram illustrating the logical flow of packets from a shared interface of an RSD to an egress interface of a PSD. For example, as shown in FIG. 5, shared interface 79 receives an inbound packet 110. In this example, network interface 79 is coupled to a shared sonet OC-192 interface and inbound packet 110 is an L2 packet having frame relay encapsulation. For packet received by RSD 66 from shared interface of IFCs 67, PFE 71 effectively operates as an L2 switch. That is, RL 102 examines the L2 header of inbound packet 110 to determine which logical network interface is associated with the packet. That is, the L2 header may, for example, include information (e.g., a Frame Relay DCLI) associated with network interface 79. Typically, configuration data provided by the administrator specifies a relation between the L2 information (e.g., VLAN tag) and the network interface of an associated PSD. In this example, RL 102 is programmed with mapping information that associates the L2 information carried by inbound packet 110 with a specific tunnel interface, i.e., ut-1/3/0 of PSD 62 in this example. RL 102 uses this mapping information to identify which PSD to which to forward the packet without needing to perform a route lookup or otherwise maintain layer three (L3) forwarding tables for the inbound packets. In one embodiment, routing engine 46A of PSD 62 communicates a token (identifier) and an interface number of tunnel interface ut-1/3/0 to routing engine 51A of RSD 66. Routing engine 51A creates a mapping that associates interface so-7/0/0 with tunnel interface ut-1/3/0 and installs the mapping within RL 102.

Upon selecting the PSD to which to forward the inbound packet 110, PFE 71 of RSD 66 places inbound packet 110 in packet buffer 103 for transmission across switch fabric 52A toward tunnel PIC 75 of that PSD. PFE 59 receives the packet from its switch fabric side as an outbound packet 110'. That is, PFE 59 views packet 110 as an outbound packet destined for logical tunnel interface 83 as an outbound interface. Moreover, PFE 59 views logical tunnel interface as providing an ingress to a network tunnel. Accordingly, PFE 59 adds a logical tunnel cookie to the outbound packet 110' to form tunnel packet 112, where the logical tunnel cookie provides identification data associated with a tunnel-like pseudowire having logical tunnel interface 83 of tunnel PIC 75 as an ingress interface and network interface 81 of IFC 57 as an egress interface. Thus, from the perspective of PFE 59, the tunnel appears similar to any other external, network tunnel having an ingress interface at FPC 50A2. PFE 59 places the outbound tunnel packet 112 in packet buffer 91 for output to tunnel interface 83 as an egress interface, which is viewed as a network destination for that PSD.

Tunnel PIC 75 receives outbound tunnel packet 112 and loops the packet back to the PFE 59 as inbound packet 114. Thus, PFE 59 receives inbound packet 114 as if the packet was received from an external network tunnel. Thus, in other words, tunnel PIC 75 is used to receive outbound packet 112 at the tunnel ingress and loop back the tunneled packet as if the packet egressed the tunnel so that PFE 59 receives an inbound L2 packet 110 destined for the shared interface 79.

Since tunnel interface 83 is configured as an egress interface for this tunnel, PFE 59 strips the tunnel cookie from packet 114, and RL 94 performs a route lookup on packet 110 as if interface 79 (so-7/0/0) were a locally connected sonet interface. As a result, RL 94 determines that the packet must be sent over switch fabric 52A to PFE 58 that hosts output interface 57. That is, forwarding information programmed within RL 94 by RE 46A of PSD 62 maps keying information within inbound packet 114 to next hop data identifying network interface 81 as the egress interface to which the packet must be sent. As a result, PFE 59 places inbound packet 114 within buffer 93 to be directed across switch fabric 52A to PFE 58 with an appropriate token to identify the outbound shared interface.

PFE 58 receives packet 114 from switch fabric 52A, adds any L2 frame relay encapsulation that may be necessary to form an output packet 116, and places the output packet in packet buffer 94 for transmission via network interface 81.

Although described with respect to packets originating from external network interfaces, packets exchanged between from RE 46 of PSD 62 and shared network interface 79 are processed in a similar manner, thus allowing the routing engine of the PSD to similarly communicate via the shared interface of the RSD.

The following sections illustrate exemplary configuration data provided by an administrator for defining a shared sonet interface (so-0/0/0) having frame relay encapsulation within an RSD. In particular, the following example configuration data defines frame relay identifiers (DLCIs) 100, 101 and 102 for the uplink, and assigns DLCI 100 and 101 with a PSD1 and shares DLCI 102 with PSD2.

In addition, the following example configuration data defines interfaces that include a logical tunnel interface for each PSD. See, for example, ut-1/0/0 and ut-2/0/0 defined for PSD1 and PSD2, respectively. The configuration data further defines the interface list to include a pseudo interface (so-0/0/0) for the shared interface of the RSD. Moreover, the configuration data specifically identifies the interface as corresponding to a shared physical interface by way of the command "shared-uplink." The command "peer interface" establishes the pseudo interface as a peer interface to logical tunnel interface defined within that PSD, thereby forming the internal tunnel between the two interfaces as described herein.

```
RSD:
----
    interfaces {
        so-0/0/0 {
            encapsulation frame-relay;
            unit 0 {
                dlci 100;
                up 1 ink-shared-with psd1;
            }
            unit 1 {
                dlci 101;
                up 1 ink-shared-with psd1;
            }
            unit 2 {
                dlci 102;
                up 1 ink-shared-with psd2;
            }
        }
    }
PSD1:
----
    interfaces {
        so-0/0/0 {
            encapsulation frame- relay ;
            shared-uplink; //Identifies this as a pseudo interface of a shared link
            unit 0 {
                dlci 100;
                peer-interface ut-1/0/0.0
                family inet {
                    address 10.10.10.1/24;
                }
            }
            unit 1 {
                dlci 101;
                peer-interface lt-1/0/0.1
                family inet {
                    address 10.10.11.1/24;
                }
            }
```

```
    }
    ut-1/0/0 {//Logical Tunnel Interface
        unit 0 {
            peer-interface so-0/0/0.0;
        }
        unit 1 {
            peer-interface so-0/0/0.1;
        }
    }
}
PSD2:
----
    interfaces {
        so-0/0/0 {
            encapsulation frame-relay;
            shared-uplink; //Identify this as a pseudo interface of a shared link
            unit 2 {
                dlci 102;
                peer-interface ut-2/0/0.0;
                family inet {
                    address 10.10.12.1/24;
                }
            }
        }
        ut-2/0/0 {//Logical Tunnel Interface
            unit 0 {
                peer-interface so-0/0/0.2 ;
            }
        }
    }
```

Various embodiments of the invention have been described. As described herein, the hardware logical routers allow isolation of routing engines, their underlying operating system kernel, as well as forwarding resources. Each PSD has its own routing engine, maintains its own kernel state, configuration, and its own forwarding state that is isolated from those of other PSDs. Each PSD can be administered separately, runs its own software version, and can be rebooted independently of other PSDs and the RSD. The multiple logical routers are isolated from each other in terms of routing and forwarding functions yet allow network interfaces to be shared between the logical routers. Moreover, different logical routers can share network interfaces without impacting the ability of any of the logical routers to be independently scaled to meet the bandwidth demands of the customers serviced by the logical router.

Various modifications to the described embodiments may be made within the scope of the invention. For example, the techniques may be readily applied to allow a PSD to share multiple interfaces on an RSD over the same tunnel interface at the PSD. Alternatively, a PSD may use multiple tunnel interfaces to peer with (map to) the same shared interface on the RSD. Together, these allow a system administrator to choose a desired relationship for mapping tunnel interfaces to shared interfaces based on bandwidth requirements, logical interface requirements of other factors for each PSD of a multi-router system.

These and other embodiments are within the scope of the following claims.

The invention claimed is:

1. A multi-router system comprising:
a plurality of routers; and
a physical interface installed within a first one of the plurality of routers and shared by other ones of the plurality of routers,
wherein each of the plurality of routers that share the physical interface of the first one of the routers store configuration information specifying the shared physical interface installed within the first one of the routers of the multi-router system and a packet header that is required by the shared physical interface,
wherein each of the routers that share the physical interface installed within the first one of the routers comprises a packet forwarding engine having respective forwarding information that maps packet keying information to next hops identifying network interfaces, wherein the respective forwarding information for each of the packet forwarding engines specifies a logical network interface assigned to the shared physical interface so that the shared physical interface appears to be local to each of the packet forwarding engines of the plurality of routers and is selectable in response to a route lookup,
wherein each of the routers that share the physical interface of the first one of the routers includes a tunnel interface card to form network tunnels,
wherein each of the routers share the physical interface by performing route lookups to select as an egress interface the respective logical network interface associated with the shared physical interface of the first one of the routers, constructing based on the configuration information fully-formed packets that have the packet header required by the shared physical interface, encapsulating the fully-formed packets within outbound tunnel packets and forwarding the outbound tunnel packets to the respective tunnel interface card of the router,
wherein the tunnel interface cards of the routers receive the outbound tunnel packets and loop the outbound tunnel packets back to the respective routers as inbound tunneled packets received from a network via a tunnel for forwarding to the first one of the routers within which the shared physical interface is installed, and
wherein the first one of the routers within which the shared physical interface is installed outputs, on the shared physical interface, the fully-formed packets received from the other ones of the plurality of routers without modification.

2. The multi-router system of claim 1, wherein each of the routers that share the physical interface is a logical router that operates as an independent router within a network.

3. The multi-router system of claim 2, wherein the shared physical interface is controlled by a routing engine of a standalone router and not associated with any of the logical routers.

4. The multi-router system of claim 3, the routing engine of the standalone router maintains control over any packet forwarding engines and interface cards of the multi-router system that are not associated with the logical routers.

5. The multi-router system of claim 1, further comprising a storage medium storing data that assigns logical tunnel interfaces to the tunnel interface cards and the logical network interfaces to the shared physical interface.

6. The multi-router system of claim 5, wherein the logical network interfaces are pseudo-interfaces that appear in routing tables of the routers as fully-routable ingress and egress interfaces.

7. The multi-router system of claim 5, wherein the data configures the logical tunnel interfaces of the routers and the logical network interfaces of the shared interface card as endpoints of a layer two (L2) pseudowire connection through the switch fabric.

8. The multi-router system of claim 1,
wherein, prior to forwarding the outbound tunnel packets to the tunnel interface cards, the packet forwarding engines of the routers form the outbound tunnel packets to include payloads encapsulating the fully-formed packets as complete layer two (L2) packets for the shared physical interface based on an uplink L2 encapsulation of the physical interface, and wherein, upon receiving the inbound tunnel packets looped back from the respective tunnel interface cards, the routers perform route lookups and output the L2 packets on the shared physical interface to the first one of the routers in which the shared physical interface is installed.

9. The multi-router system of claim 1, wherein the routers execute different software versions that can be up upgraded independently.

10. The multi-router system of claim 1, wherein the routers maintain configuration data that can be administered separately and independently from each other.

11. The multi-router system of claim 1, wherein the routers maintain separate forwarding state.

12. The multi-router system of claim 1, the routers comprises routing engines that maintain separate routing information.

13. A method of sharing a physical interface between multiple routers in a multi-router system, the method comprising:

receiving, with a first router of the multi-router system, configuration information specifying a shared physical interface installed within a second router of the multi-router system and specifying a packet header required for packets to be output on the shared physical interface without modification by the second router;

receiving packets to be forwarded by the multi-router system;

performing a route lookup with the first router of the multi-router system to select a logical network interface as a local egress interface for the packets, wherein the logical network interface is assigned to the shared physical interface of the second router of the multi-router system;

responsive to the router lookup, constructing, with the first router and from the packets, fully-formed packets that have the packet header required by the shared physical interface of the second router and encapsulating the fully-formed packets within payloads of outbound tunneled packets with the first router;

forwarding the outbound tunneled packets from the first router to a tunnel interface card of the first router;

looping the outbound tunneled packets back from the tunnel interface card to the first router of multi-router system as inbound packets received from a network via a network tunnel;

performing a route lookup on the inbound packets with the first router;

forwarding the fully-formed packets from the first router to the second router; and outputting the fully-formed packets on the shared physical interface of the second router without modification of the fully-formed packets by the second router.

14. The method of claim 13, wherein the outbound tunneled packets include a logical tunnel cookie that provides identification data associated with an internal tunnel through a tunnel interface card of the router.

15. The method of claim 13, wherein constructing fully-formed packets comprises forming, with the first router, the packets as a complete layer two (L2) packets having an L2 header that is required for output on the shared physical interface of the second router based on an uplink L2 encapsulation of the shared physical interface.

* * * * *